(12) United States Patent
Konishi

(10) Patent No.: US 11,915,433 B2
(45) Date of Patent: Feb. 27, 2024

(54) OBJECT TRACKING SYSTEM, TRACKING PARAMETER SETTING METHOD, AND NON-TRANSITORY COMPUTER READABLE MEDIUM

(71) Applicant: NEC Corporation, Tokyo (JP)

(72) Inventor: Yusuke Konishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 361 days.

(21) Appl. No.: 17/436,722

(22) PCT Filed: Dec. 20, 2019

(86) PCT No.: PCT/JP2019/050155
§ 371 (c)(1),
(2) Date: Sep. 7, 2021

(87) PCT Pub. No.: WO2020/183855
PCT Pub. Date: Sep. 17, 2020

(65) Prior Publication Data
US 2022/0172379 A1 Jun. 2, 2022

(30) Foreign Application Priority Data
Mar. 14, 2019 (JP) .................................. 2019-046959

(51) Int. Cl.
*G06K 9/00* (2022.01)
*G06T 7/277* (2017.01)
*G06T 7/80* (2017.01)

(52) U.S. Cl.
CPC ................ *G06T 7/277* (2017.01); *G06T 7/80* (2017.01); *G06T 2207/20076* (2013.01)

(58) Field of Classification Search
None
See application file for complete search history.

(56) References Cited

U.S. PATENT DOCUMENTS 8,891,821 B2* 11/2014 Sato ........................ G06T 7/277
382/104
10,909,377 B2* 2/2021 Chen ....................... G06T 7/246
(Continued)

FOREIGN PATENT DOCUMENTS

JP 2012-059224 A 3/2012
JP 5472976 82 4/2014

OTHER PUBLICATIONS

Pallauf et al., "State-dependent and distributed pedestrian tracking using the (C)PHD filter," 2014 IEEE International Instrumentation and Measurement Technology Conference (12MTC) Proceedings, Montevideo, Uruguay, 2014, pp. 1216-1220, doi: 10.1109/12MTC.2014.6860937. (Year: 2014).*

(Continued)

*Primary Examiner* — Feng Niu
(74) *Attorney, Agent, or Firm* — Sughrue Mion, PLLC

(57) ABSTRACT

An object tracking system according to the present disclosure includes: object position detection means for detecting a position of an object by using a sensor; object tracking parameter storage means for storing a parameter related to an erroneous detection or a non-detection caused by a detection characteristic of the sensor; object tracking means for performing tracking based on the position obtained by the object position detection means and the parameter stored in the object tracking parameter storage means; object tracking result evaluation means for calculating an evaluation index based on a result obtained by the object tracking means; and object tracking parameter updating means for determining the parameter based on the evaluation index calculated by the object tracking result evaluation means and updating the parameter stored in the object tracking parameter storage means.

7 Claims, 3 Drawing Sheets

(56) References Cited

U.S. PATENT DOCUMENTS

2012/0093364 A1* 4/2012 Sato ..................... G06T 7/277
                                                    382/103
2013/0050502 A1   2/2013 Saito et al.
2018/0342067 A1* 11/2018 Saito ..................... G06T 7/20

OTHER PUBLICATIONS

Jida et al., "Bayesian Networks and Probabilistic Data Association Methods for Multi-Object Tracking: Application to Road Safety," 2008 3rd International Conference on Information and Communication Technologies: From Theory to Applications, Damascus, Syria, 2008, pp. 1-6 (Year: 2008).*

International Search Report for PCT Application No. PCT/JP2019/050155, dated Mar. 10, 2020.

Ba-Ngu Vo et al., "Sequential Monte Carlo implementation of the PHD filter for multi-target tracking". IEEE Fusion, Feb. 2003, pp. 1-8.

Yoonchang Sung et al., "GM-PHD Filter for Searching and Tracking an Unknown Number of Targets with a Mobile Sensor with Limited FOV", IEEE Transactions on Automation Science and Engineering, Dec. 23, 2018, pp. 1-12.

* cited by examiner $$v_k(x) = [1 - p_{D,k}(x)]v_{k|k-1}(x) + \sum_{z \in Z_k} \frac{p_{D,k}(x)g_k(z|x)v_{k|k-1}(x)}{K_k(z) + \int p_{D,k}(\xi)g_k(z|\xi)v_{k|k-1}(\xi)d\xi}$$

Fig. 2

OBJECT TRACKING SYSTEM, TRACKING PARAMETER SETTING METHOD, AND NON-TRANSITORY COMPUTER READABLE MEDIUM This application is a National Stage Entry of PCT/JP2019/050155 filed on Dec. 20, 2019, which claims priority from Japanese Patent Application 2019-046959 filed on Mar. 14, 2019, the contents of all of which are incorporated herein by reference, in their entirety.

TECHNICAL FIELD

The present disclosure relates to an object tracking system, a tracking parameter setting method, and a tracking parameter setting program and, in particular, to a technique for setting a parameter in processing for detecting an object by a sensor and tracking the detected object.

BACKGROUND ART

Object tracking systems for detecting objects using various types of sensors, such as a camera, a millimeter wave radar, and a laser range scanner, and tracking the detected objects have been proposed. The object tracking system requires that parameters used to detect an object and track the detected object be set to appropriate values.

Patent Literature 1 discloses a technique for selecting an optimum parameter based on a result of setting a wide range of parameters and performing an operation.

Patent Literature 2 discloses a technique for determining a degree of reliability of tracking processing of a moving object and estimating tracking parameters based on a tracking result having a high degree of reliability. According to the technique disclosed in Patent Literature 2, the tracking parameter can be automatically adjusted for a variation originating from an environmental change.

Meanwhile, Non-Patent Literature 1 discloses a technique related to a Probability Hypothesis Density (PHD) filter that updates a presence probability distribution of an object based on the position of the object detected by a sensor and a detection characteristic of the sensor and tracks the object.

CITATION LIST

Patent Literature

Patent Literature 1: Japanese Patent No. 5472976
Patent Literature 2: Japanese Unexamined Patent Application Publication No. 2012-059224

Non Patent Literature

Non Patent Literature 1: Ba-Ngu Vo, S. Singh, A. Doucet, "Sequential monte carlo implementation of the phd filter for multi-target tracking", IEEE FUSION 2003

SUMMARY OF INVENTION

Technical Problem

When an object is detected by using a sensor and the detected object is tracked, there is a problem that a detection characteristic of the sensor changes in response to a place and time, so that a parameter cannot be appropriately set and performance of tracking is thus degraded.

In such a case, even when the technique disclosed in Patent Literature 2 is used, the parameter cannot be updated until a tracking result having a high degree of reliability is obtained, and thus it is not possible to dynamically respond to an environmental change.

The present disclosure has been made in order to solve the aforementioned problem and an object thereof is to provide an object tracking system, a tracking parameter setting method, and a tracking parameter setting program that are capable of, in an object tracking system that detects an object by a sensor and tracks the detected object, dynamically updating parameters related to an erroneous detection and a non-detection caused by a detection characteristic of the sensor and reducing degradation of performance of the object tracking even when the detection characteristic of the sensor changes in response to a place and time.

Solution to Problem

An object tracking system according to the present disclosure is an object tracking system configured to track a position of an object, the object tracking system including: object position detection means for detecting the position of the object by using a sensor; object tracking parameter storage means for storing a parameter related to an erroneous detection or a non-detection caused by a detection characteristic of the sensor; object tracking means for tracking the position of the object based on the position of the object obtained by the object position detection means and the parameter stored in the object tracking parameter storage means; object tracking result evaluation means for calculating, based on a tracking result of the object obtained by the object tracking means, an evaluation index of the tracking result; and object tracking parameter updating means for determining the parameter based on the evaluation index of the tracking result calculated by the object tracking result evaluation means and updating the parameter stored in the object tracking parameter storage means.

A tracking parameter setting method according to the present disclosure is a method for setting a tracking parameter related to an erroneous detection or a non-detection caused by a detection characteristic of a sensor configured to detect an object, the method being used in an object tracking system configured to track a position of the object and including: detecting the position of the object by using the sensor; tracking the position of the object based on the detected position of the object and the tracking parameter; calculating, based on a tracking result of the object, an evaluation index of the tracking result; and updating the tracking parameter based on the calculated evaluation index of the tracking result.

A tracking parameter setting program according to the present disclosure is a program for setting a tracking parameter related to an erroneous detection or a non-detection caused by a detection characteristic of a sensor configured to detect an object, the program being used in an object tracking system configured to track a position of the object and causing a computer to: detect the position of the object by using the sensor; track the position of the object based on the detected position of the object and the tracking parameter; calculate, based on a tracking result of the object, an evaluation index of the tracking result; and update the tracking parameter based on the calculated evaluation index of the tracking result.

Advantageous Effects of Invention

According to the present disclosure, it is possible to, in an object tracking system that detects an object by a sensor and tracks the detected object, dynamically update parameters related to an erroneous detection and a non-detection caused by a detection characteristic of the sensor and reduce degradation of performance of the object tracking even when the detection characteristic of the sensor changes in response to a place and time.

BRIEF DESCRIPTION OF DRAWINGS

FIG. 2 is an expression for expressing a presence probability distribution of an object that can be used in the example embodiment of the present disclosure.

DESCRIPTION OF EMBODIMENTS

First Example Embodiment

Figure 1:
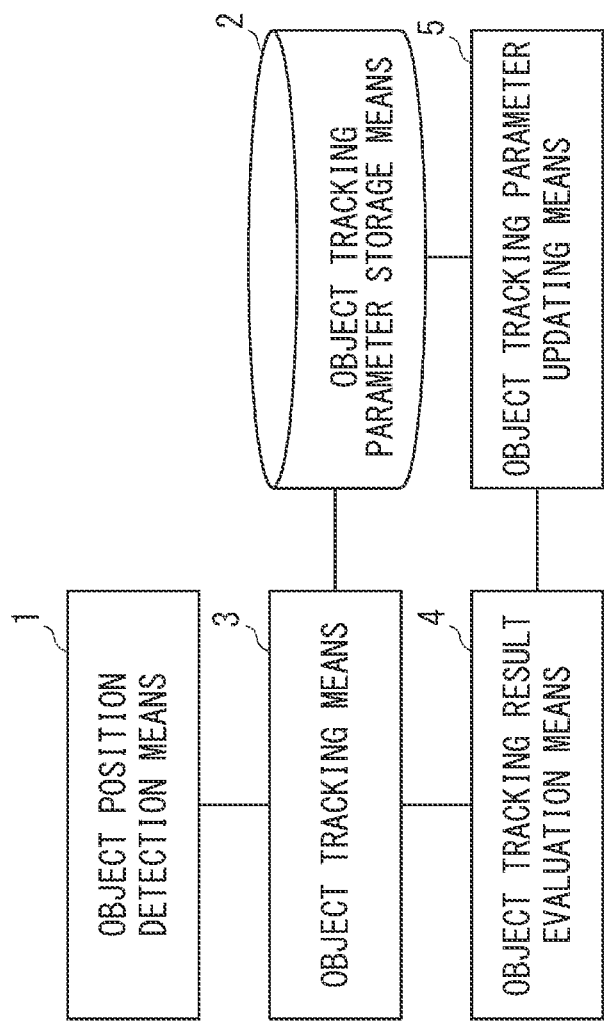
FIG. 1 is a block diagram of an object tracking system according to an example embodiment of the present disclosure.

A configuration of an object tracking system according to an example embodiment of the present disclosure will be described with reference to FIG. 1. As shown in FIG. 1, the object tracking system includes object position detection means 1, object tracking parameter storage means 2, object tracking means 3, object tracking result evaluation means 4, and object tracking parameter updating means 5.

The object position detection means 1 detects a position of an object by using a sensor. The object tracking parameter storage means 2 stores a parameter related to an erroneous detection or a non-detection caused by a detection characteristic of the sensor. The object tracking means 3 tracks the position of the object based on the position of the object obtained by the object position detection means 1 and the parameter stored in the object tracking parameter storage means 2. The object tracking result evaluation means 4 calculates, based on a tracking result of the object obtained by the object tracking means 3, an evaluation index of the tracking result. The object tracking parameter updating means 5 determines a parameter based on the evaluation index of the tracking result calculated by the object tracking result evaluation means 4 and updates the parameter stored in the object tracking parameter storage means.

The object tracking system according to this example embodiment is configured to calculate, based on a tracking result of an object, an evaluation index of the tracking result, and then determine a parameter based on the evaluation index and update the determined parameter, and thus it is possible to, in an object tracking system that detects an object by a sensor and tracks the detected object, dynamically update parameters related to an erroneous detection and a non-detection caused by a detection characteristic of the sensor and reduce degradation of performance of the object tracking even when the detection characteristic of the sensor changes in response to a place and time.

Second Example Embodiment

A configuration of an object tracking system according to an example embodiment of the present disclosure will be described with reference to FIG. 1. As shown in FIG. 1, the object tracking system includes the object position detection means 1, the object tracking parameter storage means 2, the object tracking means 3, the object tracking result evaluation means 4, and the object tracking parameter updating means 5.

The object position detection means 1 detects a position of an object at a certain time by using a sensor. As the sensor, a camera, a millimeter wave radar, a laser range scanner or the like can be used.

The object tracking parameter storage means 2 is capable of storing a parameter related to an erroneous detection or a non-detection caused by a detection characteristic of the sensor.

As the parameter related to an erroneous detection, an erroneous detection probability and an erroneous detection occurrence probability density can be used. The erroneous detection probability is a ratio of the number of erroneous detections to the total number of detections. The erroneous detection occurrence probability density is the number of erroneous detections per unit area. As the parameter related to a non-detection, a non-detection probability and a detection probability can be used. The non-detection probability is a probability that the sensor does not detect an object when the object is present in a detection range of the sensor. The detection probability is a probability that the sensor detects an object when the object is present in a detection range of the sensor. Note that the non-detection probability can be obtained by subtracting the detection probability from 1.0. Further, parameters related to an erroneous detection and a non-detection can be changed depending on the position where the object is present.

The object tracking means 3 tracks an object by sequentially updating the presence probability distribution of an object based on a presence probability distribution expression of the object shown in FIG. 2 by using a Probability Hypothesis Density (PHD) filter based on the position of the object obtained by the object position detection means 1 and the parameters related to an erroneous detection and a non-detection stored in the object tracking parameter storage means 2.

In the expression shown in FIG. 2, x is a variable indicating a position. k is a variable indicating a time. z is an observation result, and $Z_k$ is a set of the observation results at the time k. In the expression shown in FIG. 2, the parameter related to an erroneous detection is $\kappa_k(z)$, which represents an erroneous detection probability. The parameter related to a non-detection is $p_{D,k}(x)$, which represents a detection probability. When it is assumed that a large number of erroneous detections occur, it is necessary to increase $\kappa_k(z)$, while when it is assumed that a small number of erroneous detections occur, it is necessary to reduce $\kappa_k(z)$. Further, when it is assumed that a large number of non-detections occur, it is necessary to reduce $p_{D,k}(x)$, while when it is assumed that a small number of non-detections occur, it is necessary to increase $p_{D,k}(x)$. Further, in the expression shown in FIG. 2, E1 is a presence probability distribution (a posterior probability) of the object at the position x. E2 represents a probability distribution in which the object is present at the position although no object has been detected. In E2, E21 is a detection probability at the position x. E22 is a presence probability distribution (a prior probability) of the object at the position x. E3 represents (likelihood of occurrence of an observation z at the position x)/(likelihood of occurrence of the observation z). In E3, E31 is a detection probability at the position x. E32 is an observation likelihood. E33 is an erroneous detection probability of the observation z.

The object tracking result evaluation means 4 executes evaluation processing based on a tracking result of the object obtained by the object tracking means 3, and calculates an evaluation index for the tracking result.

The object tracking parameter updating means 5 determines parameters related to an erroneous detection and a non-detection based on the evaluation index calculated by the object tracking result evaluation means 4, and updates the parameters stored in the object tracking parameter storage means 2.

Figure 3:
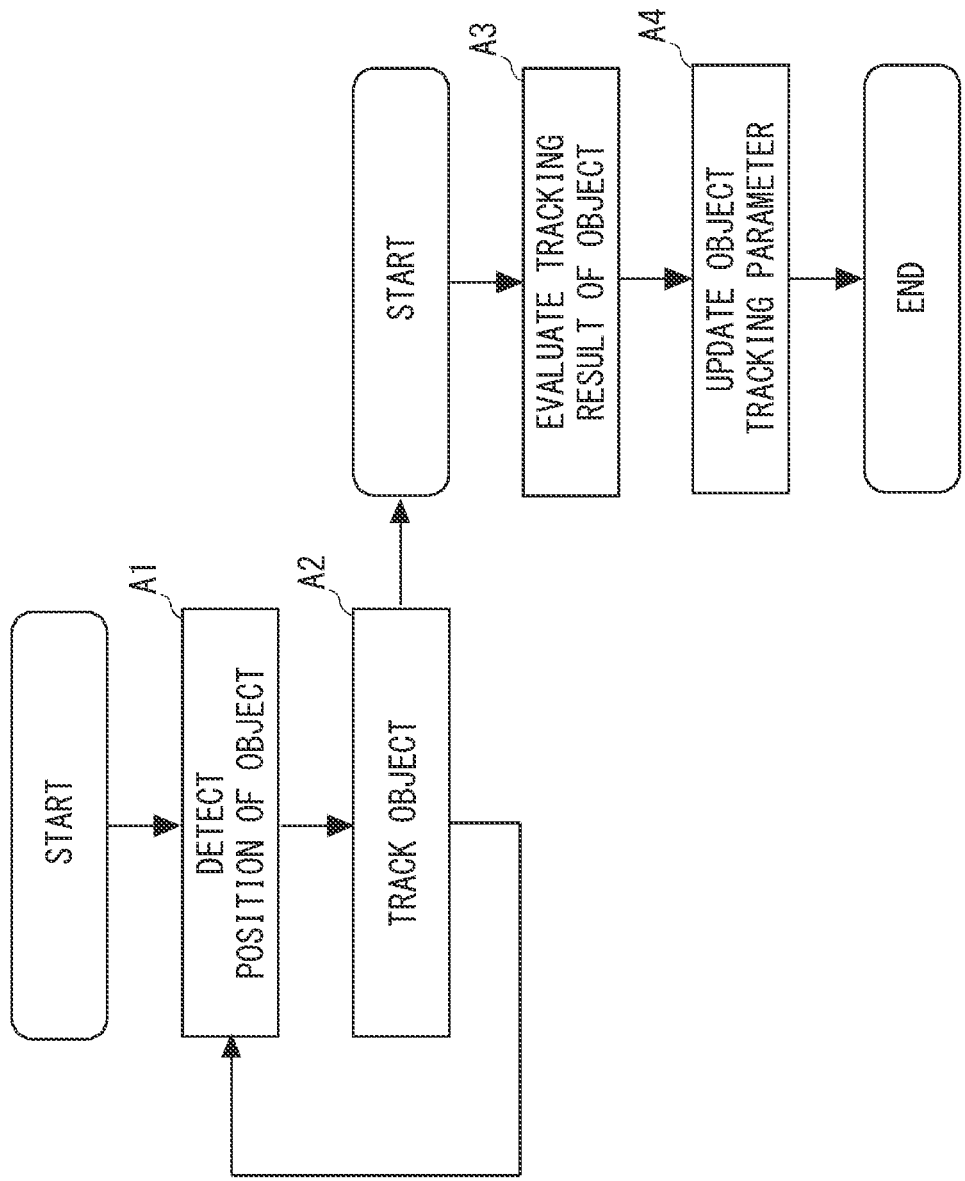
FIG. 3 is a flowchart of object tracking processing according to the example embodiment of the present disclosure.

Next, processing performed in the tracking system according to the first example embodiment of the present disclosure will be described with reference to FIG. 3. The object position detection means 1 detects a position of an object at a certain time by using a sensor such as a camera, a millimeter wave radar, and a laser range scanner (Step A1). Next, the object tracking means 3 tracks the position of the object by using the position of the object obtained by the object position detection means 1 and a parameter stored in the object tracking parameter storage means 2 (Step A2). The processing for detecting a position of the object (Step A1) and the processing for tracking the object (Step A2) are repeatedly executed a predetermined number of times or for a predetermined period of time. The object tracking result evaluation means 4 executes, based on a tracking result of the object obtained by the object tracking means 3, processing for evaluating the tracking result, thereby calculating an evaluation index for the tracking result (Step A3). Next, the object tracking parameter updating means 5 determines the parameter based on the evaluation index for the tracking result calculated by the object tracking result evaluation means 4 and updates the parameter stored in the object tracking parameter storage means 2 (Step A4).

By the object tracking system according to this example embodiment, it is possible to dynamically adjust a parameter in accordance with a change in the detection characteristic of the sensor and reduce degradation of performance of the object tracking.

Third Example Embodiment

In a third example embodiment, the number of objects to be tracked included in a tracking result is used as an evaluation index calculated by the object tracking result evaluation means 4. Note that a system configuration and a processing flow are the same as those shown in FIGS. 1 and 3, and thus the descriptions thereof will be omitted.

When a parameter related to an erroneous detection is updated to a value that assumes that a large number of erroneous detections occur, that is, a value that makes it difficult to find objects in order to reduce the occurrence of an erroneous detection when a relatively large number of erroneous detections occur, the objects cannot be easily found and thus the number of objects to be tracked is reduced. On the other hand, when this parameter is updated to a value that assumes that a small number of erroneous detections occur, that is, a value that makes it easier to find objects when a relatively small number of erroneous detections occur while allowing a certain increase in the probability of the occurrence of an erroneous detection, the objects can be easily found and thus the number of objects to be tracked increases.

When it is determined that the number of objects to be tracked is larger than a predetermined value (a reference value), the object tracking result evaluation means 4 determines that it has become easy to find objects, and updates the parameter related to an erroneous detection to a value that assumes that a large number of erroneous detections occur. Further, when it is determined that the number of objects to be tracked is smaller than the predetermined value, the object tracking result evaluation means 4 determines that it has become difficult to find objects, and updates the parameter related to an erroneous detection to a value that assumes that a small number of erroneous detections occur. By the above-described method, it is possible to appropriately control the number of tracking results. Here, the predetermined value may be a fixed value, or may instead be changed to a value determined in advance in accordance with an environmental change.

Fourth Example Embodiment

In a fourth example embodiment, as an evaluation index of a tracking result calculated by the object tracking result evaluation means 4, a tracking duration in the tracking result is used. Note that a system configuration and a processing flow are the same as those shown in FIGS. 1 and 3, and thus the descriptions thereof will be omitted.

When a parameter related to a non-detection is updated to a value that assumes that a large number of non-detections occur, that is, a value that reduces the occurrence of a non-detection when a relatively large number of non-detections occur and that further increases a tracking time of an object, the object can be easily tracked and thus the tracking time becomes longer. On the other hand, when this parameter is updated to a value that assumes that a small number of non-detections occur, that is, a value that further reduces the tracking time of an object while allowing a certain increase in the occurrence of a non-detection when a relatively small number of non-detections occur, the object cannot be easily tracked and thus the tracking time becomes shorter.

When it is determined that the duration of the tracking result is shorter than a predetermined value, the object tracking result evaluation means 4 determines that it has become difficult to continue the tracking, and updates the parameter related to a non-detection to a value that assumes that a large number of non-detections occur. Further, when it is determined that the duration of the tracking result is longer than the predetermined value, the object tracking result evaluation means 4 determines that it has become easy to continue the tracking, and updates the parameter related to a non-detection to a value that assumes that a small number of non-detections occur. By the above-described method, it is possible to appropriately control the duration of the tracking result. Here, the predetermined value may be a fixed value, or may instead be changed to a value determined in advance in accordance with an environmental change.

Various types of processing in the above-described example embodiments can be implemented by hardware or software. For example, any processing can also be implemented by causing a Central Processing Unit (CPU) to execute a computer program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above-described example embodiments and may be modified as appropriate without departing from the spirit of the present disclosure.

Although the present disclosure has been described with reference to the example embodiments, the present disclosure is not limited to the above-described example embodiments. Various modifications that may be understood by those skilled in the art may be made to the configurations and details of the present disclosure within the scope of the disclosure.

This application is based upon and claims the benefit of priority from Japanese patent application No. 2019-046959, filed on Mar. 14, 2019, the disclosure of which is incorporated herein in its entirety by reference.

REFERENCE SIGNS LIST

1 OBJECT POSITION DETECTION MEANS
2 OBJECT TRACKING PARAMETER STORAGE MEANS
3 OBJECT TRACKING MEANS
4 OBJECT TRACKING RESULT EVALUATION MEANS
5 OBJECT TRACKING PARAMETER UPDATING MEANS

What is claimed is:

1. An object tracking system configured to track a position of an object by using a sensor, the object tracking system comprising:
   at least one memory storing instructions and a parameter related to an erroneous detection or a non-detection caused by a detection characteristic of the sensor;
   at least one processor configured to execute the instructions to:
   detect the position of the object by using the sensor;
   track the position of the object based on the position of the object obtained by using the sensor and the parameter stored in the at least one memory;
   calculate, based on the tracking result of the object, an evaluation index of the tracking result; and
   determine the parameter based on the evaluation index of the tracking result calculated and update the parameter stored in the at least one memory.

2. The object tracking system according to claim 1, wherein the at least one processor is further configured to execute the instructions to:
   calculate the number of the objects to be tracked as an evaluation index.

3. The object tracking system according to claim 2, wherein the at least one processor is further configured to execute the instructions to:
   when the number of the objects to be tracked calculated is larger than a predetermined value, update the parameter related to the erroneous detection to a value that assumes that a large number of the erroneous detections occur, and
   when the number of the objects to be tracked calculated is smaller than the predetermined value, update the parameter related to the erroneous detection to a value that assumes that a small number of the erroneous detections occur.

4. The object tracking system according to claim 1, wherein the at least one processor is further configured to execute the instructions to:
   calculate a duration of the tracking result as the evaluation index.

5. The object tracking system according to claim 4, wherein the at least one processor is further configured to execute the instructions to:
   when the duration of the tracking result calculated is shorter than a predetermined value, update the parameter related to the non-detection to a value that assumes that a large number of the non-detections occur, and
   when the duration of the tracking result calculated is longer than the predetermined value, update the parameter related to the non-detection to a value that assumes that a small number of the non-detections occur.

6. A method for setting a tracking parameter related to an erroneous detection or a non-detection caused by a detection characteristic of a sensor configured to detect an object, the method being used in an object tracking system configured to track a position of the object and comprising:
   detecting the position of the object by using the sensor;
   tracking the position of the object based on the detected position of the object and the tracking parameter;
   calculating, based on a tracking result of the object, an evaluation index of the tracking result; and
   updating the tracking parameter based on the calculated evaluation index of the tracking result.

7. A non-transitory computer readable medium storing a program for setting a tracking parameter related to an erroneous detection or a non-detection caused by a detection characteristic of a sensor configured to detect an object, the program being used in an object tracking system configured to track a position of the object and causing a computer to:
   detect the position of the object by using the sensor;
   track the position of the object based on the detected position of the object and the tracking parameter;
   calculate, based on a tracking result of the object, an evaluation index of the tracking result; and
   update the tracking parameter based on the calculated evaluation index of the tracking result.

* * * * *